United States Patent
Chen et al.

(10) Patent No.: US 11,279,874 B2
(45) Date of Patent: Mar. 22, 2022

(54) QUANTUM DOT

(71) Applicant: National Tsing Hua University, Hsinchu (TW)

(72) Inventors: Hsueh-Shih Chen, Hsinchu (TW); Chang-Wei Yeh, Taoyuan (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 0 days.

(21) Appl. No.: 16/937,333

(22) Filed: Jul. 23, 2020

(65) Prior Publication Data
US 2021/0340440 A1    Nov. 4, 2021

(30) Foreign Application Priority Data
May 4, 2020    (TW) .................................. 109114808

(51) Int. Cl.
| | | |
|---|---|---|
| *C09K 11/06* | (2006.01) | |
| *C09K 11/88* | (2006.01) | |
| *C09K 11/56* | (2006.01) | |
| *B82Y 20/00* | (2011.01) | |
| *B82Y 40/00* | (2011.01) | |
| *B82Y 30/00* | (2011.01) | |

(52) U.S. Cl.
CPC ............ *C09K 11/06* (2013.01); *C09K 11/565* (2013.01); *C09K 11/883* (2013.01); *B82Y 20/00* (2013.01); *B82Y 30/00* (2013.01); *B82Y 40/00* (2013.01); *C09K 2211/188* (2013.01)

(58) Field of Classification Search
CPC ..... C09K 11/883; C09K 11/565; B82Y 20/00; B82Y 30/00; B82Y 40/00
See application file for complete search history.

(56) References Cited

U.S. PATENT DOCUMENTS

| 7,678,359 B2 * | 3/2010 | Chung .................. B82Y 30/00 |
| | | 423/508 |
| 9,732,273 B2 * | 8/2017 | Yan ......................... H01B 1/02 |

FOREIGN PATENT DOCUMENTS

| CN | 103450904 A | | 12/2013 |
| CN | 1080048073 | * | 5/2018 |
| CN | 109609116 A | | 4/2019 |
| TW | 201900852 A | | 1/2019 |

OTHER PUBLICATIONS

Yeh et al, "Inhibiting the Surface Oxidation of Low-Cadmim-Content ZnS(Cd,Se) Quantum Dots for Enhancing Application Reliability", ACS Appl. Nano. Mater., 2019, 2, pp. 5290-5301, Jul. 1, 2019.*
Translation for CN 108048073, May 18, 2018.*
Taiwanese Search Report for Taiwanese Application No. 109114808, dated Feb. 26, 2021, with English translation.
Yeh et al., "Inhibiting the Surface Oxidation of Low-Cadmim-Content ZnS:(Cd,Se) Quantum Dots for Enhancing Application Reliability," ACS Applied Nano Materials, vol. 2, 2019 (published Jul. 1, 2019), pp. 5290-5301.

* cited by examiner

*Primary Examiner* — C Melissa Koslow
(74) *Attorney, Agent, or Firm* — Birch, Stewart, Kolasch & Birch, LLP

(57) ABSTRACT

A quantum dot is represented by $Zn_{0.5-x}Cd_xS_{0.5-y}Se_y$, and has a size ranging from 7 nm to 20 nm, wherein $0<x<0.2$, $0.005 \leq y < 0.2$, and Zn, Cd, S, and Se are non-uniformly distributed therein.

8 Claims, 19 Drawing Sheets

US 11,279,874 B2

QUANTUM DOT

CROSS-REFERENCE TO RELATED APPLICATION

This application claims priority of Taiwanese Invention Patent Application No. 109114808, filed on May 4, 2020.

FIELD

The disclosure relates to a quantum dot, and more particularly to a quantum dot having an improved stability and quantum yield.

BACKGROUND

Since groups II to VI optoelectronic semiconductor compounds (e.g., zinc sulfide (ZnS) and cadmium sulfide (CdS)) have unique luminescent properties, such compounds are adapted for use in lighting or displays by doping engineering. Quantum dots made from the aforesaid optoelectronic semiconductor compounds in a nanometer scale are frequently utilized in a multiple-colour laser, an optical sensor or a biological imaging device, etc., due to their tunable optical properties. Furthermore, the quantum dots have a great potential for use in solar cells because of their high optical absorption coefficient and specific emission wavelength. Since the quantum dots made from such optoelectronic semiconductor compounds have various applications, many researchers have endeavored to enhance stability and quantum yield (QY) thereof.

There have been reports that the quantum dots are very sensitive to the external environment due to their large surface-to-volume ratio, and the surface ligands are easily detached from the surface of the quantum dots, which causes oxidation of the quantum dots and a decrease in the QY.

In Yongfen Chen et al. (2008), *J. Am. Chem. Soc.*, 130:5026-5027, a giant nanocrystal quantum dot (g-NQD) having a size ranging from 15 nm to 20 nm is grown from with a cadmium selenide (CdSe) core that has a size ranging from 3 nm to 4 nm, followed by sequentially applying 18 to 19 monolayers of inorganic shells (i.e., CdS, ZnS, or $Cd_xZn_yS$ alloys, calculated based on the amount of shell precursor added) over a time period of 5 days with a reasonable control over size dispersity and a retention of a regular faceted particle shape. The shell structure of the g-NQD is either a single-component including 19 layers of CdS (i.e., 19CdS), or a multicomponent including 11 layers of CdS, 6 layers of $Cd_xZn_yS$ and 2 layers of ZnS (i.e., 11CdS-6$Cd_xZn_y$S-2ZnS), wherein the 6 layers of alloyed shell material (i.e. 6$Cd_xZn_y$S) are successively richer in Zn (from 0.13% to 0.80%). The g-NQDs CdSe/19CdS and CdSe/11CdS-6$Cd_xZn_y$S-2ZnS have a size of 15.5±3.1 nm and 18.3±2.9 nm, respectively.

The g-NQDs disclosed in such reference are uniquely insensitive to changes in ligand concentration and identity, and has a better chemical stability in comparison with that of the NQD having a CdSe core only. However, the QY of the g-NQDs is unsatisfactory. Therefore, there is still a need to provide an improved quantum dots exhibiting enhanced stability and QY.

SUMMARY

Therefore, an object of the disclosure is to provide a quantum dot that can alleviate at least one of the drawbacks of the prior art.

According to the disclosure, the quantum dot is represented by $Zn_{0.5-x}Cd_xS_{0.5-y}Se_y$, and has a size ranging from 7 nm to 20 nm, wherein $0<x<0.2$, $0.005 \leq y<0.2$, and Zn, Cd, S, and Se are non-uniformly distributed therein.

BRIEF DESCRIPTION OF THE DRAWINGS

Other features and advantages of the disclosure will become apparent in the following detailed description of the embodiment (s) with reference to the accompanying drawings, of which.

Figure 18:
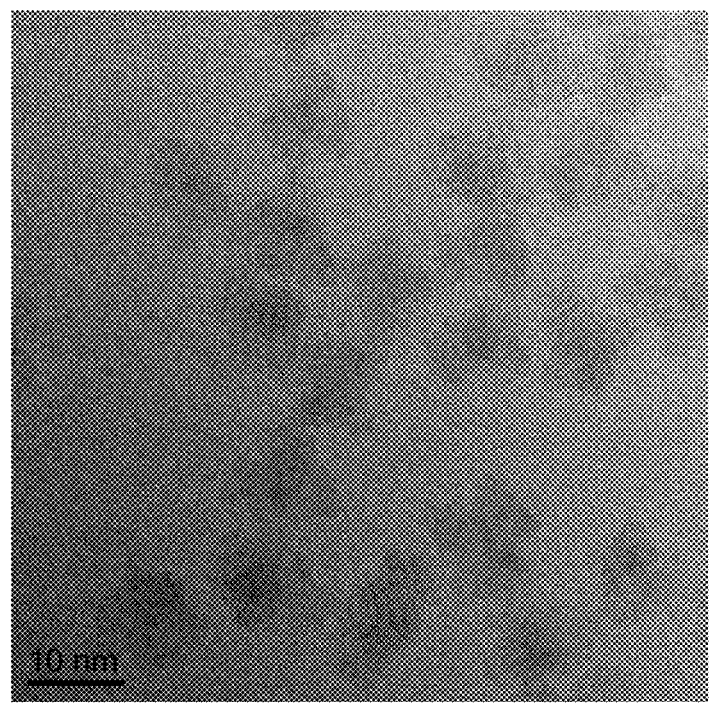
Figure 19:
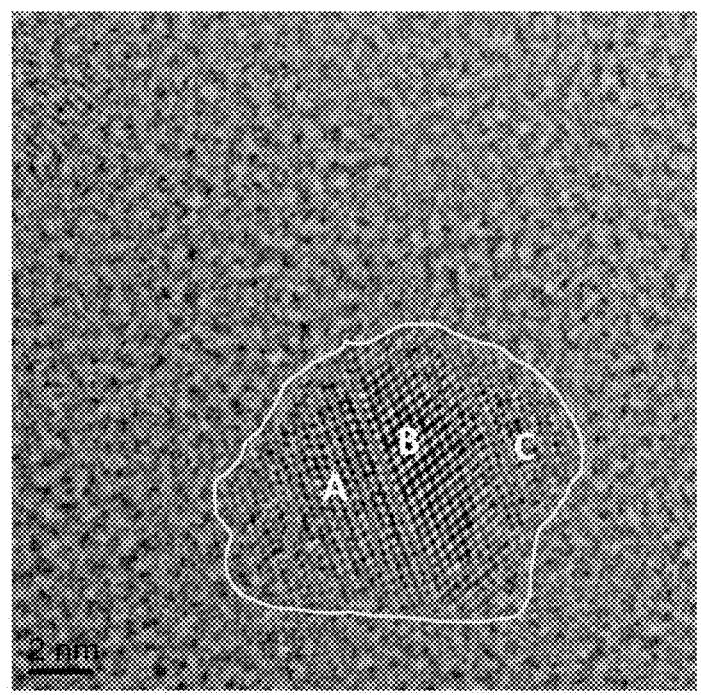
Figure 20:
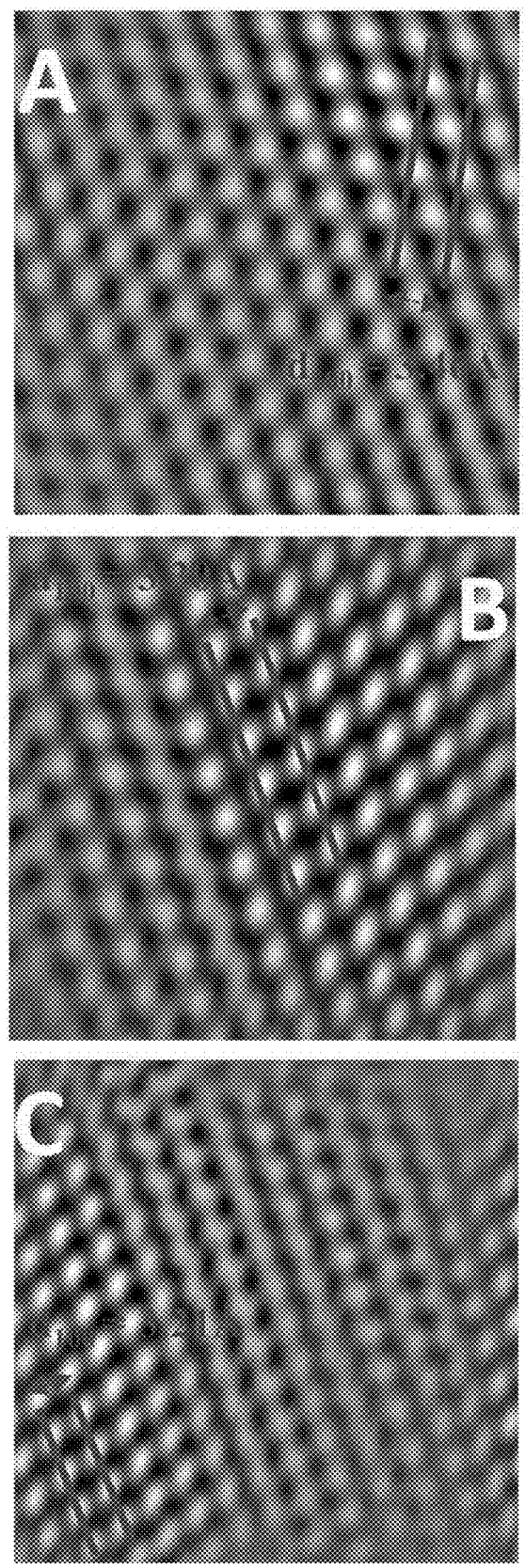
Figure 21:
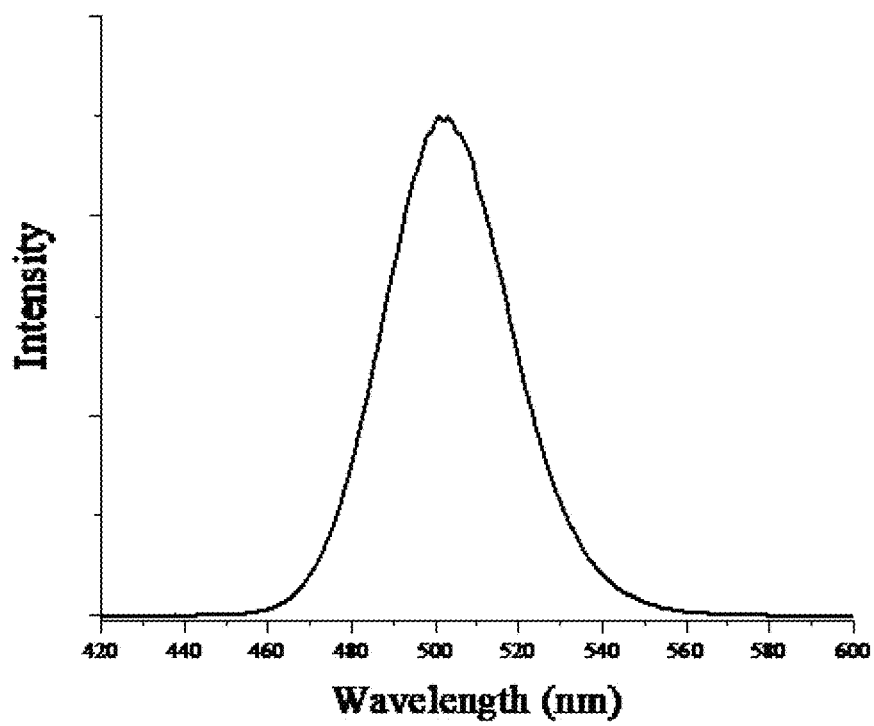
Figure 22:
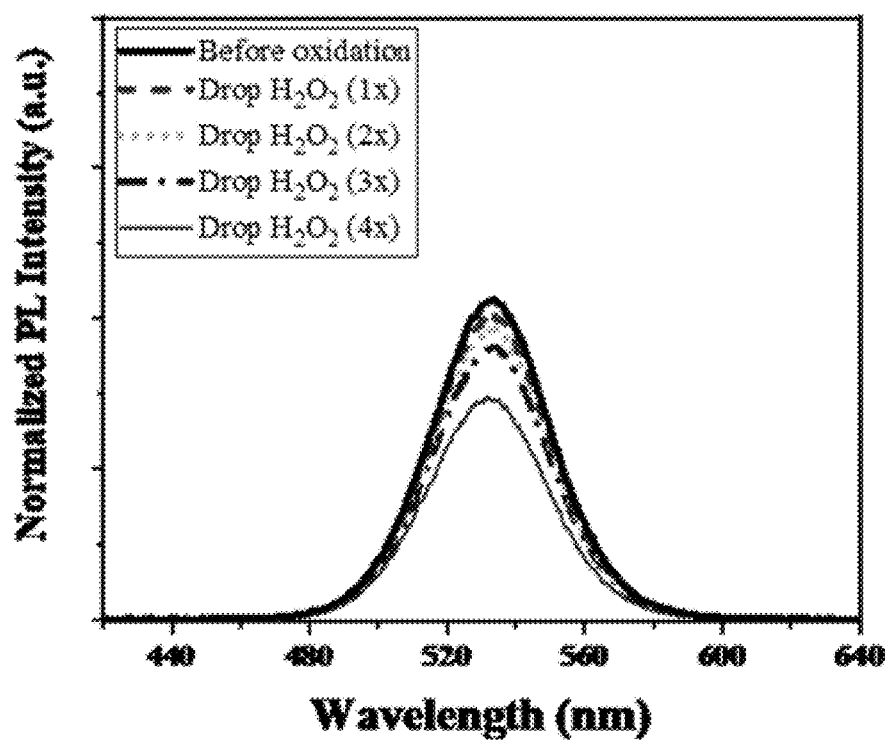
Figure 23:
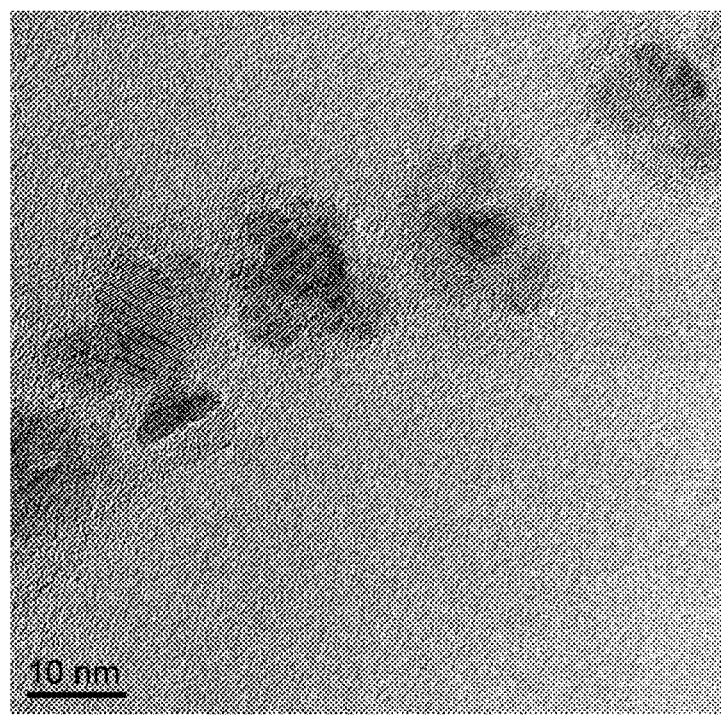
Figure 24:
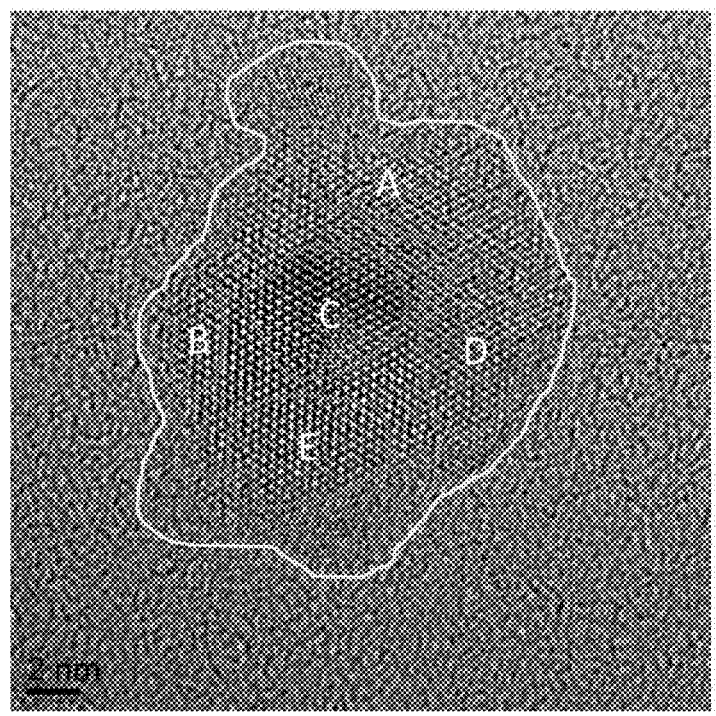
Figure 25:
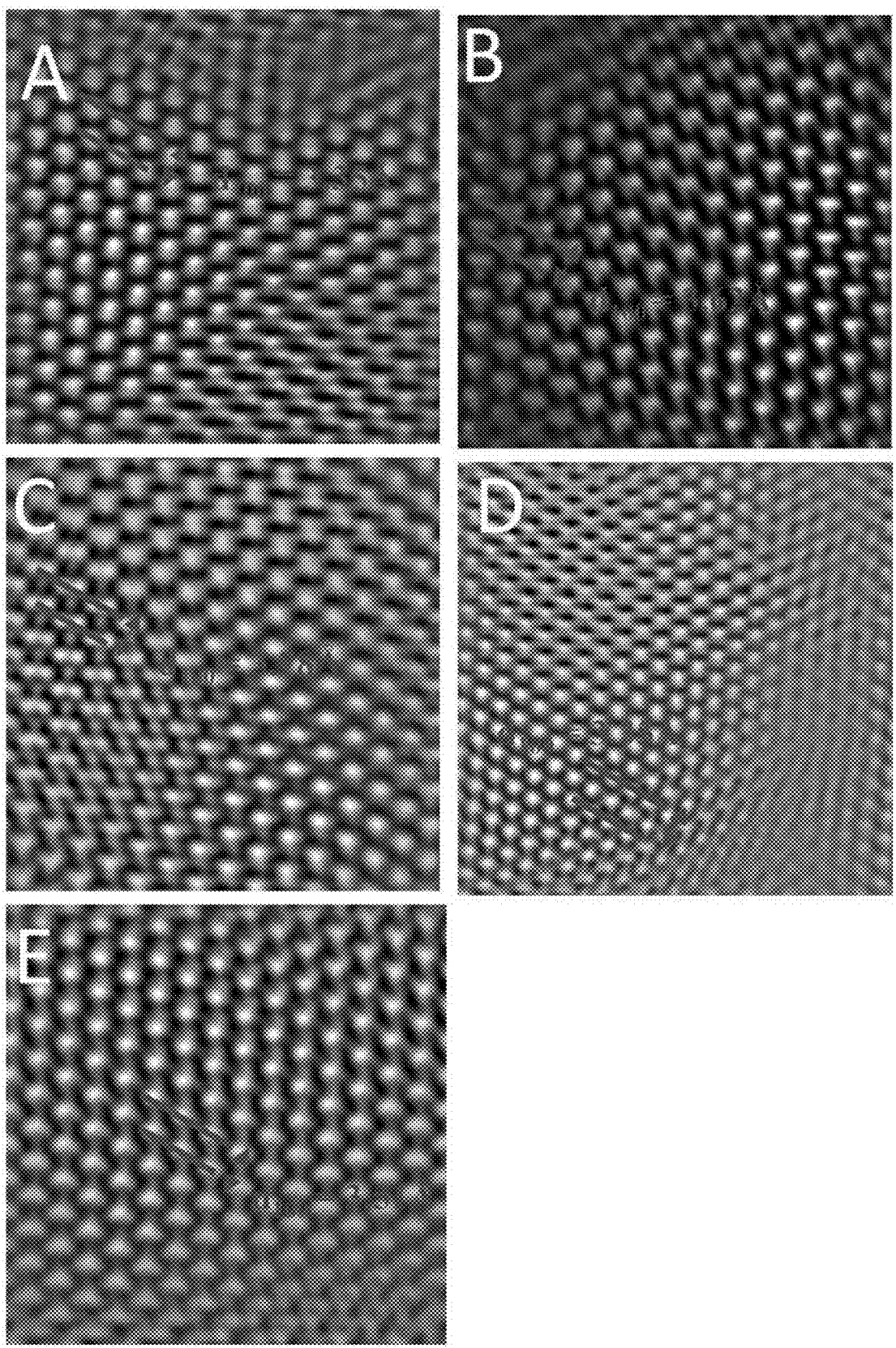
Figure 26:
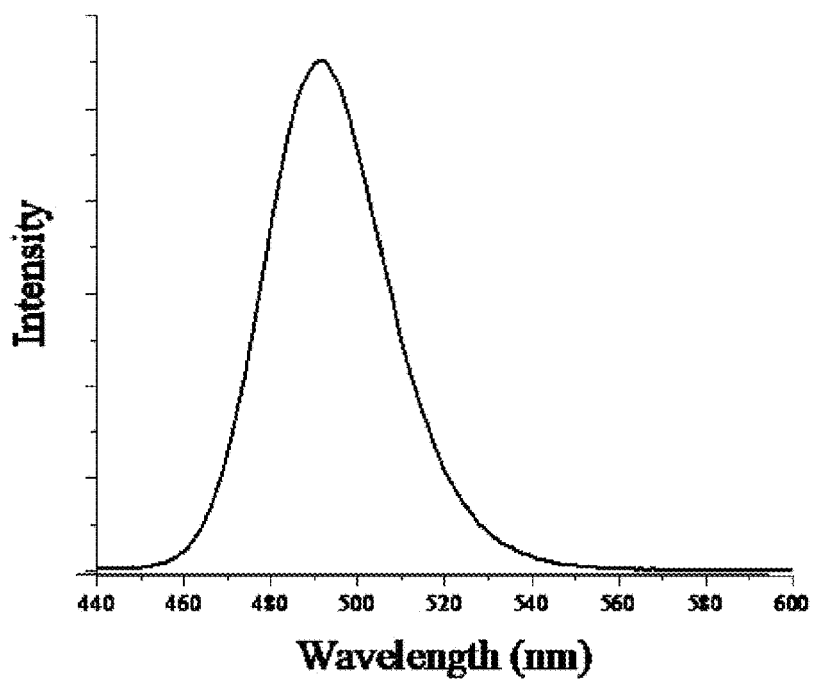
Figure 27:
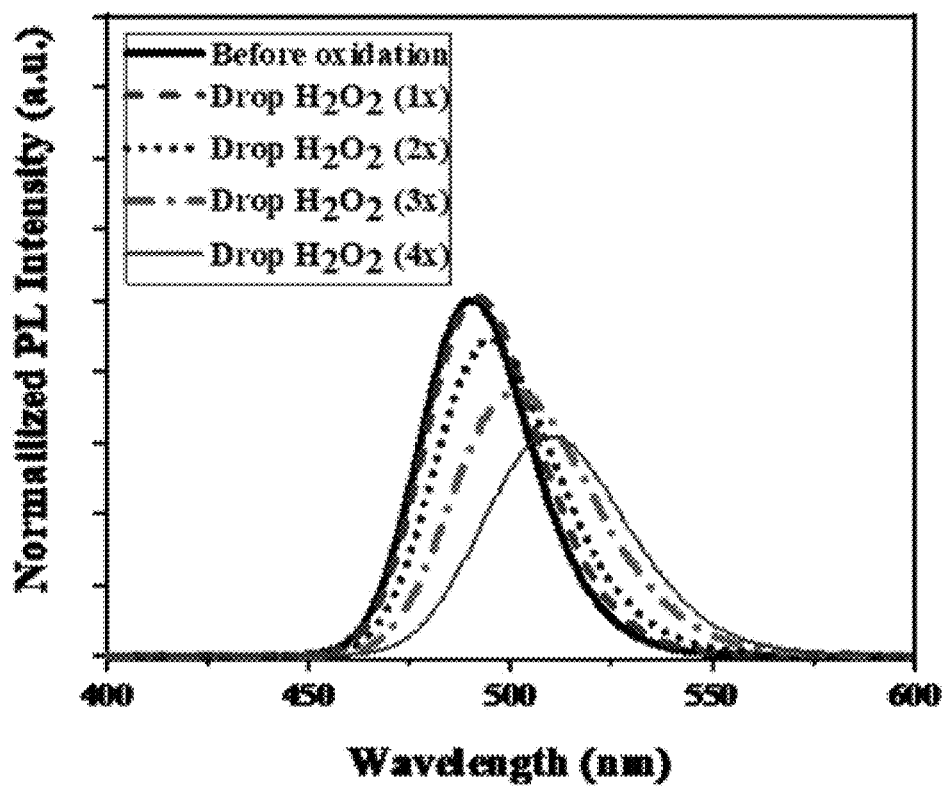
Figure 28:
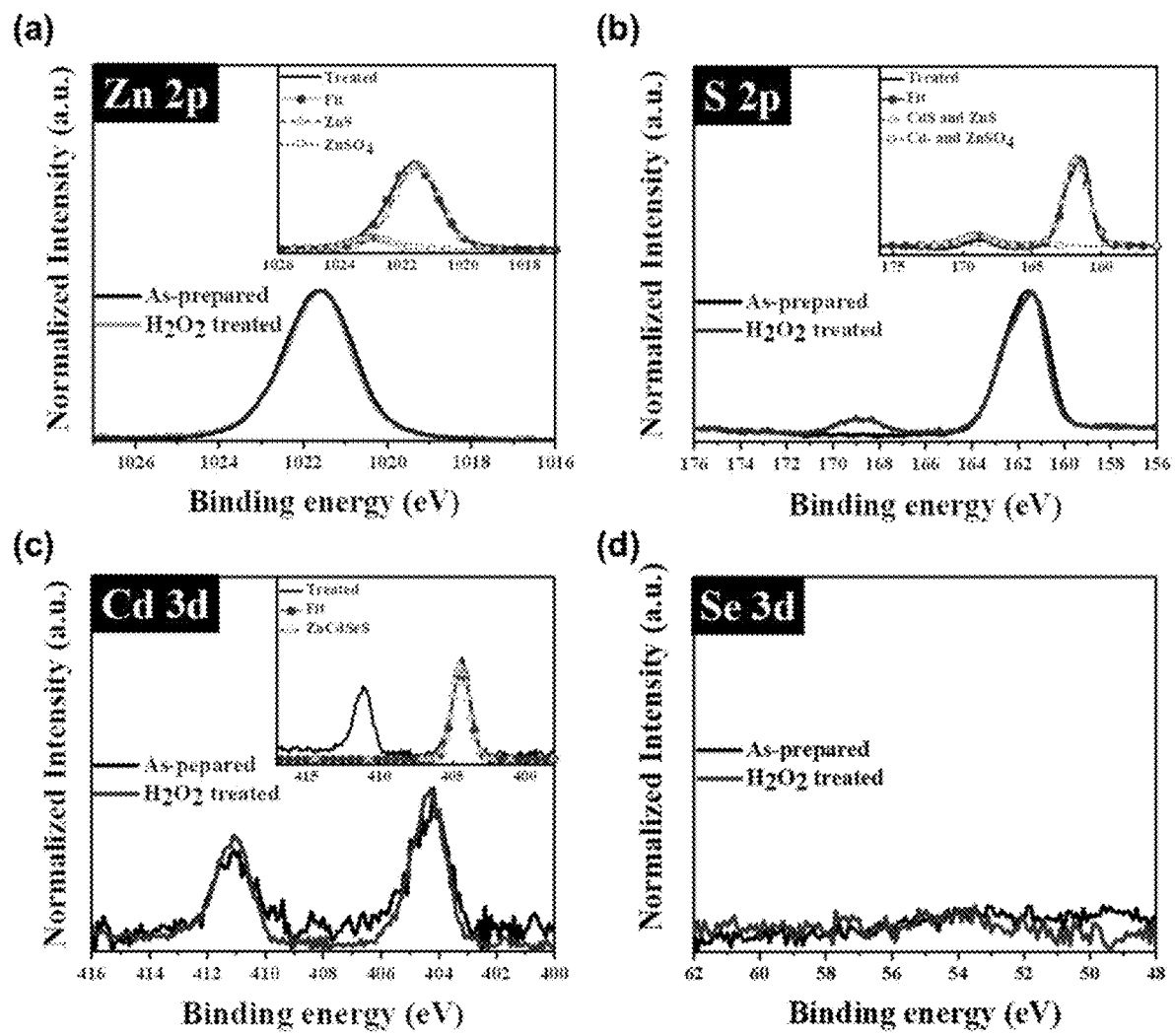

and "H$_2$O$_2$ treated", respectively) for Zn 2p peak (a), S 2p peak (b), Cd 3d peak (c), and Se 3d peak (d);

FIG. 18 is a TEM image illustrating a structure of the quantum dot of Example 3 (E3) according to the disclosure;

FIG. 19 is a HRTEM image illustrating the microstructure of the quantum dot of E3;

FIG. 20 shows partially enlarged views of FIG. 19 illustrating the quantum dot of E3 having different interplanar spacings of (100) planes (d$_{100}$) at three different areas (represented by A to C);

FIG. 21 is a PL spectrum plot illustrating a quantum yield of the quantum dot of E3;

FIG. 22 is a PL spectrum plot illustrating a change in the quantum yield of the quantum dot of E3 before and after oxidation treatment;

FIG. 23 is a TEM image illustrating a structure of the quantum dot of Example 4 (E4) according to the disclosure;

FIG. 24 is a HRTEM image illustrating the microstructure of the quantum dot of E4;

FIG. 25 shows partially enlarged views of FIG. 24 illustrating the quantum dot of E4 having different interplanar spacings of (100) planes (d$_{100}$) at five different areas (represented by A to E);

FIG. 26 is a PL spectrum plot illustrating a quantum yield of the quantum dot of E4;

FIG. 27 is a PL spectrum plot illustrating a change in the quantum yield of the quantum dot of E4 before and after oxidation treatment; and FIG. 28 shows four XPS plots illustrating a change in binding energy of the quantum dot of E4 before and after oxidation treatment (represented by "As-prepared" and "H$_2$O$_2$ treated", respectively) for Zn 2p peak (a), S 2p peak (b), Cd 3d peak (c), and Se 3d peak (d).

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

The present disclosure provides a quantum dot, which is represented by $Zn_{0.5-x}Cd_xS_{0.5-y}Se_y$, and has a size ranging from 7 nm to 20 nm, wherein 0<x<0.2, 0.005≤y<0.2, and Zn, Cd, S, and Se are non-uniformly distributed therein.

In certain embodiments, x is greater than 0.02 and smaller then 0.18, i.e., 0.02<x<0.18. In other embodiments, y is not smaller than 0.005 and smaller than 0.05, i.e., 0.005≤y<0.05.

In certain embodiments, the quantum dot has a quantum yield (QY) ranging from 30% to 90%.

The quantum dot of this disclosure has a single crystal structure. In an exemplary embodiment, the quantum dot includes a ZnS-based dot body that contains Cd and Se. In such case, y may range from 0.008 to 0.043.

In another exemplary embodiment, the quantum dot has a core-shell structure, and includes the ZnS-based dot body serving as a core, and further includes a ZnS shell layer surrounding the ZnS-based dot body. In such case, y may range from 0.005 to 0.037.

The disclosure will be further described by way of the following examples. However, it should be understood that the following examples are solely intended for the purpose of illustration and should not be construed as limiting the disclosure in practice.

EXAMPLES

General Experimental Materials
1. Cadmium oxide (CdO), zinc acetate (ZnAc), selenium (Se) powder, oleic acid (Oac), octadecene (ODE), dodecanethiol (DDT), and tributylphosphine (TBP) were purchased from Sigma-Aldrich.
2. Sulfur (S) powder, and trioctylphosphine (TOP) were purchased from Alfa Aesar.
3. Toluene (C$_7$H$_8$), and methanol (CH$_3$OH) solvents were purchased from J. T. Baker.
4. Hydrogen peroxide aqueous solution (30 wt % H$_2$O$_2$ in H$_2$O) was purchased from Sigma-Aldrich.

Preparation of Zn-Based Precursor and Cd-Based Precursor

ZnAc was reacted with ODE and Oac under stirring at 150° C. for 1 hour in an inert gas atmosphere, so as to form a Zn-based precursor.

CdO was reacted with ODE and Oac under stirring at 150° C. for 1 hour in an inert gas atmosphere, so as to form a Cd-based precursor.

Preparation of S-Based Precursor and Se-Based Precursor

Sulfur powders were dissolved in TOP, followed by stirring at 60° C. for 1 hours in an inert atmosphere, and then cooled at room temperature (about 25° C.), so as to form the first S-based precursor, i.e., trioctylphosphine sulfide (TOPS).

Sulfur powders were dissolved in TBP, followed by stirring at 60° C. for 1 hours in an inert atmosphere, and then cooled at room temperature (about 25° C.), so as to form the first S-based precursor, i.e., tributylphosphine sulfide (TBPS).

Selenium powders were dissolved in TOP, followed by stirring at 60° C. for 1 hour in an inert gas atmosphere, and then cooled to room temperature (about 25° C.), so as to form a Se-based precursor, i.e., trioctylphosphine selenide (TOPSe).

Preparation of Quantum Dots

Comparative Example (CE)

A process for manufacturing the quantum dots of CE is described as follows.

First, the Zn-based precursor (0.2 M) was heated to 305° C., and then TOPS (1.8M) was injected into the heated Zn-based precursor, followed by stirring at 300° C. for 1 minute to proceed with a nucleation and growth reaction. The as-synthesized solution (QDs solution) was cooled to room temperature. Toluene and methanol in a volume ratio of 5:3 were then added to form a precipitate in the as-synthesized solution, followed by centrifugation at 5000 rpm for 10 minutes and collection of the precipitate, so as to obtain ZnS quantum dots (ZnS QDs) of CE.

Example 1 (E1)

First, the Zn-based precursor (0.2 M) and the Cd-based precursor (0.01 M) were added in a reaction bottle and then heated to 305° C. Next, TOPS (0.1 M) was injected into the heated reaction bottle under stirring for 3 seconds to proceed with a nucleation reaction, followed by injection of TOPSe (0.007 M) and TOPS (1.7 M) into the reaction bottle under stirring at 300° C. for 3 minutes to proceed with a growth reaction. The as-synthesized solution (QDs solution) was cooled to room temperature, followed by subjecting the precipitate in the as-synthesized solution to purification procedure (including precipitation, centrifugation, and collection of the precipitate as described in CE), so as to obtain the quantum dots of E1.

The quantum dots of E1 were dispersed in toluene and then analyzed using inductively coupled plasma mass spectrometry (ICP-MS) (AGILENT 7500ce) to determine the composition thereof. The result shows that the quantum dots of E1 have a chemical formula represented by $Zn_{0.334}Cd_{0.166}S_{0.492}Se_{0.008}$ (hereinafter referred to as QD-LSe), i.e., a ZnS-based dot body containing Cd and Se.

Example 2 (E2)

The quantum dots of E2 were prepared by procedures similar to those of E1, except that in E2, after TOPS (0.1 M) was injected into the heated reaction bottle under stirring for 3 seconds, TOPSe (0.02 M) and TOPS (1.7M) were further injected into the reaction bottle under stirring at 300° C. for 3 minutes. The quantum dots of E2, as analyzed by ICP-MS, have a chemical formula represented by $Zn_{0.322}Cd_{0.178}S_{0.457}Se_{0.043}$ (hereinafter referred to as QD-HSe), and have a structure similar to those of E1, i.e., the ZnS-based dot body containing Cd and Se.

Example 3 (E3)

The quantum dots of E3 were prepared by procedures similar to those of E1, except that the crystallization solution in E3 was further subjected to a shell growth reaction using the Zn-based precursor and TOPS, so as to form a shell layer rich in Zn and S on the ZnS-based dot body. That is, the quantum dots of E3 have a core-shell structure.

Specifically, the Zn-based precursor (0.3M) and the Cd-based precursor (0.01 M) were added into a reaction bottle and then heated to 305° C. Next, TOPS precursor (0.1 M) was injected into the heated reaction bottle under stirring for 3 seconds, followed by injection of TOPSe (0.06 M) and TOPS (1.7M) under stirring at 300° C. for 3 minutes, so as to form a ZnS-based dot body containing Cd and Se. Immediately thereafter, the Zn-based precursor (0.5 M) was injected into the reaction bottle at 290° C. for 10 minutes, followed by injection of TOPS (1.2 M) at 280° C. under stirring for 10 minutes, so as to form a shell layer rich in Zn and S on the ZnS-based dot body.

After the purification procedure, the thus obtained quantum dots of E3, as were analyzed by ICP-MS, have a chemical formula represented by $Zn_{0.443}Cd_{0.057}S_{0.463}Se_{0.037}$ (hereinafter referred to as QD-HSe/mZnS).

Example 4 (E4)

The quantum dots of E4, which have a core-shell structure similar to that of E3, were prepared by procedures similar to those of E3 except for the amounts of the precursors used in E4.

Specifically, the Zn-based precursor (0.2M) and the Cd-based precursor (0.01 M) were added into a reaction bottle, and then heated to 305° C. Next, TOPS (0.1 M) was injected into the heated reaction bottle under stirring for 3 seconds, followed by injection of TOPSe (0.01 M) and TOPS (1.7 M) under stirring at 300° C. for minutes. Immediately thereafter, the Zn-based precursor (0.7 M) was injected into the reaction bottle at 290° C., followed by injection of DDT and TBPS (3.6 M) in a volume ratio of 1:4 at 280° C.

After the purification procedure, the thus obtained quantum dots of E4, as analyzed by ICP-MS, have a chemical formula represented by $Zn_{0.475}Cd_{0.025}S_{0.495}Se_{0.005}$ (hereinafter referred to as QD-LSe/tZnS), and have a Se content of 0.5%, which is lower than that of E3 (3.7%).

Oxidation Test: Hydrogen Peroxide ($H_2O_2$) Treatment

In order to determine the quantum yield (QY) and stability, the quantum dots of each of CE and E1 to E4 were subjected to $H_2O_2$ treatment followed by photoluminescence (PL) analysis.

To be specific, $H_2O_2$ aqueous solution (30%) was diluted with a mixture of toluene and methanol having a volume ratio of 1:4, so as to obtain 1 mM of diluted $H_2O_2$ solution. The quantum dots of CE and E1 to E4 were respectively dispersed in 3.0 mL of toluene solution to prepare QD samples having the same concentration. To conduct the oxidation test, each of QD samples was treated with the diluted $H_2O_2$ solution for four times respectively at four selected time intervals (i.e., $0^{th}$ hour, $77^{th}$ hours, $166^{th}$ hours, $216^{th}$ hours), and each treated amount of $H_2O_2$ is 50 µL. PL spectra were then recorded by HORIBA FluoroMax-4 spectrometer equipped with the integration sphere at the above-mentioned time intervals. UV-vis absorption was measured using a HITACHI U-3900 apparatus.

After the oxidation test, the QD samples were stored in low water and oxygen environment (i.e., glovebox) for other characterizations, such as TEM analysis.

Characterization of QDs

Size, size distribution, and surface microstructure of QDs were mainly analyzed by high-resolution transmission electron microscopy (TEM, JEOLJEM-3000F) with HAADF detectors. These samples were prepared by directly dispersing QD samples on a copper grid coated with amorphous carbon film.

The surface chemistry of QDs was studied by X-ray photoelectron spectroscopy (XPS, PHI Quantera SXM).

Analysis of Results

Figure 1:
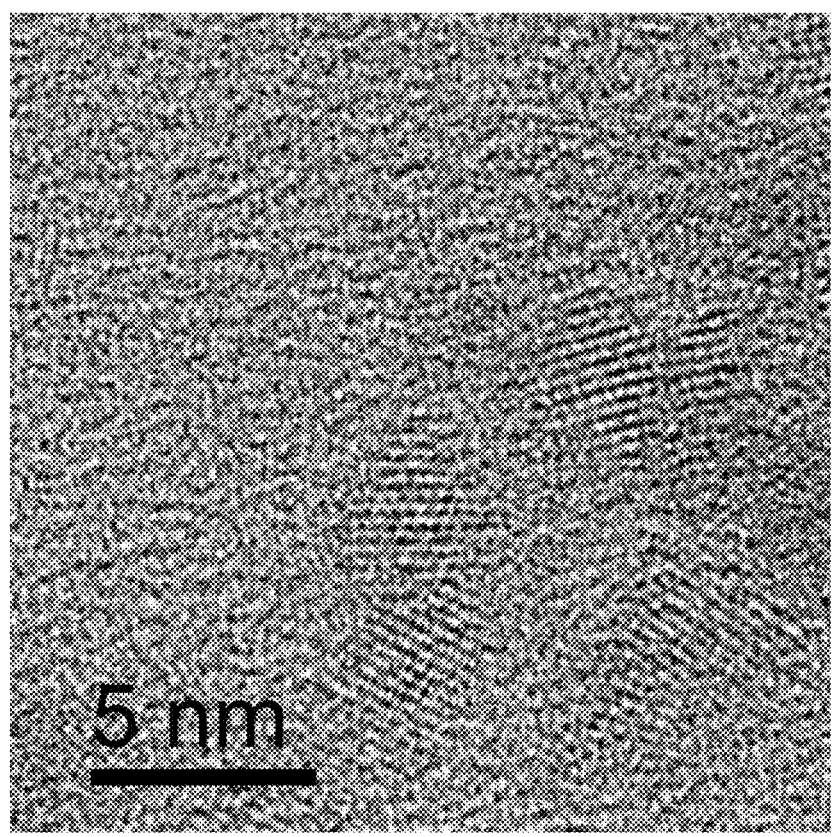
FIG. 1 is a high resolution transmission electron microscope (HRTEM) image illustrating a structure of a quantum dot of Comparative Example (CE)

Referring to FIG. 1, the ZnS quantum dots of CE are single crystals having a size of around 4 nm.

Figure 2:
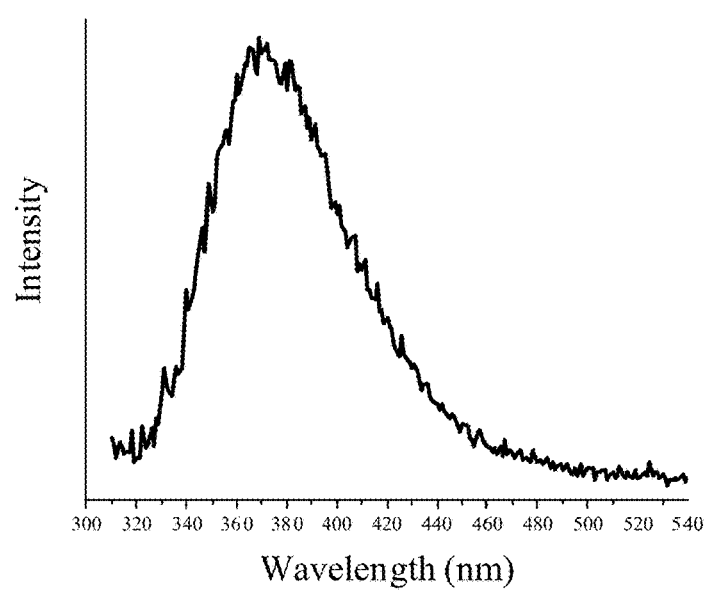
FIG. 2 is a photoluminescence (PL) spectrum plot illustrating an emission wavelength and a quantum yield (QY) of the quantum dot of CE.

Referring to FIG. 2, the quantum dots of CE, after being subjected to ultra-violet (UV) radiation, has a light emission wavelength of 369 nm and a QY of less than 10%.

Figure 3:
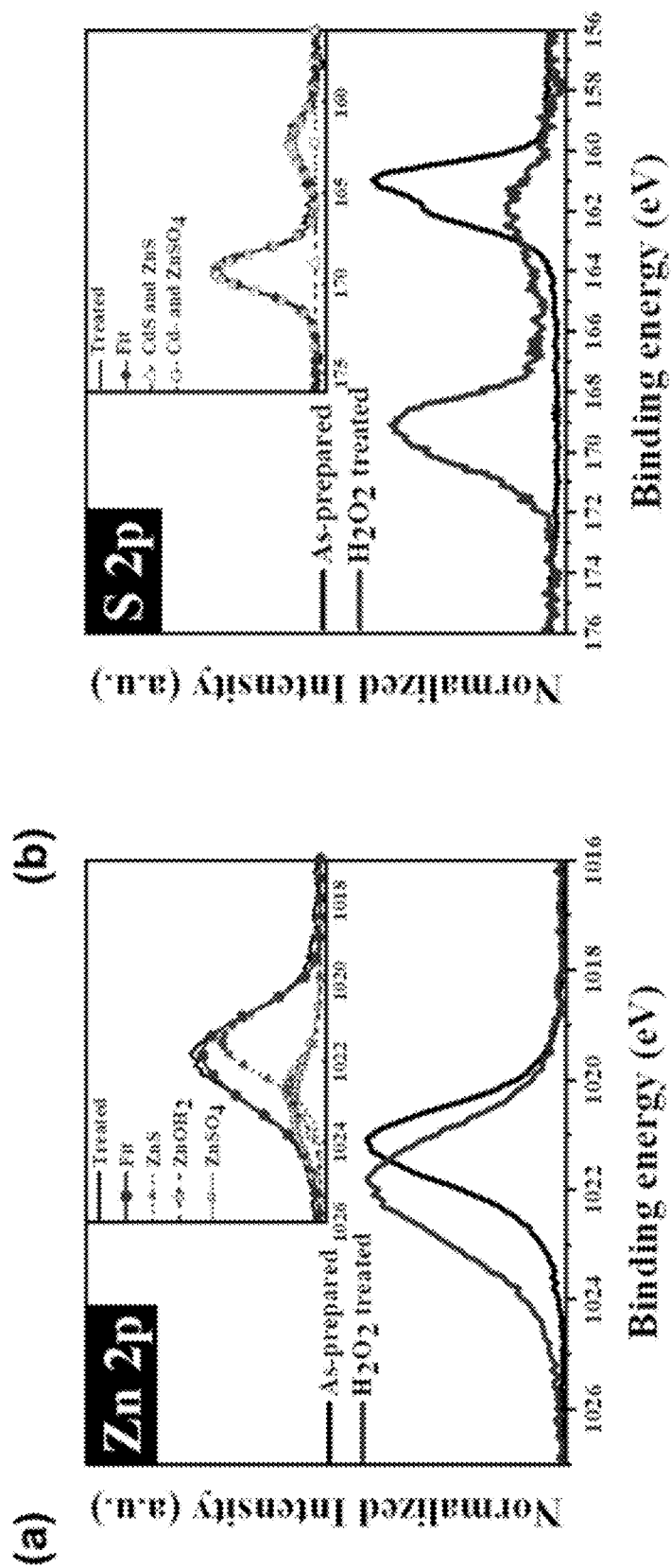
FIG. 3 shows two X-ray photoelectron spectrum (XPS) plots respectively illustrating a change in binding energy of the quantum dot of CE before and after oxidation treatment (represented by "As-prepared" and "$H_2O_2$ treated", respectively) for Zn 2p peak (a) and S 2p peak (b)

It can be seen in the XPS spectra of FIG. 3 that, before the $H_2O_2$ treatment, the ZnS quantum dots of CE (shown as "As-prepared") have a Zn 2p binding energy of 1021.1 eV and a S 2p binding energy of 161.0 eV. After the $H_2O_2$ treatment, the ZnS quantum dots (shown as "$H_2O_2$ treated") have an obvious chemical shift in both of the Zn 2p binding energy (+0.8 eV→1021.9 eV) and the S 2p binding energy (+8.1 eV→169.1 eV), which are ascribed to the oxidation of Zn surface and S surface, respectively. To be specific, by virtue of spectral deconvolution, it is noted that the Zn 2p peak of the $H_2O_2$-treated ZnS quantum dots comprises three peaks at 1021.5 eV, 1022.7 eV, and 1023.2 eV, which are respectively assigned to one pure ZnS peak (ZnS Zn 2p, 1021.6 eV or 1022.0 eV), and two oxidized ZnS peaks. The two oxidized ZnS peaks correspond to $ZnSO_4$ ($ZnSO_4$ Zn 2p, 1023.1 eV), and $Zn(OH)_2$ ($Zn(OH)_2$ Zn 2p, 1022.6 eV or 1022.7 eV), which should exist at the oxidized ZnS surface. In addition, the S 2p peak of ZnS quantum dots of CE exhibits similar results (i.e. the chemical shift of +8.1 eV).

Figure 4:
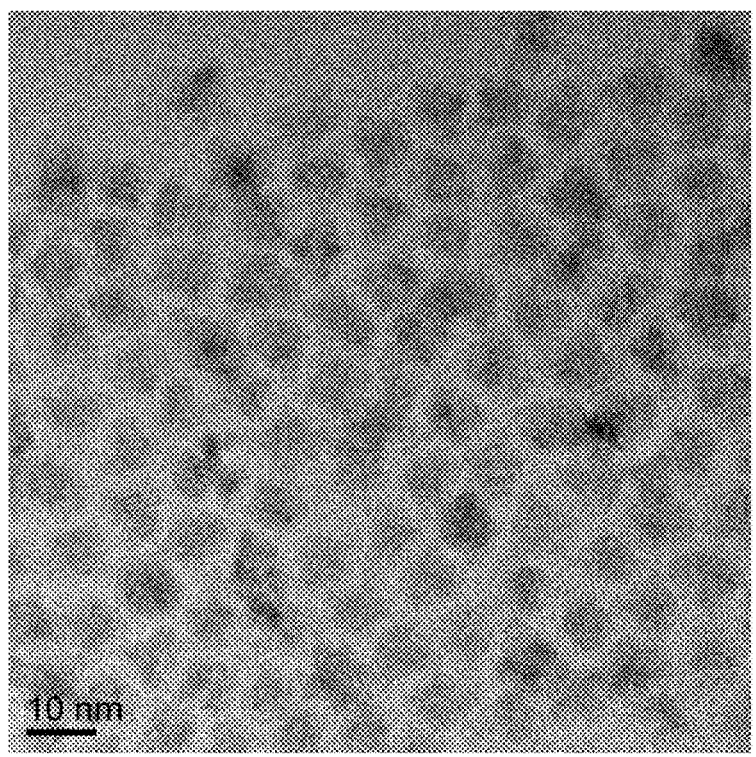
FIG. 4 is a TEM image illustrating a structure of the quantum dot of Example 1 (E1) according to the disclosure.
Figure 5:
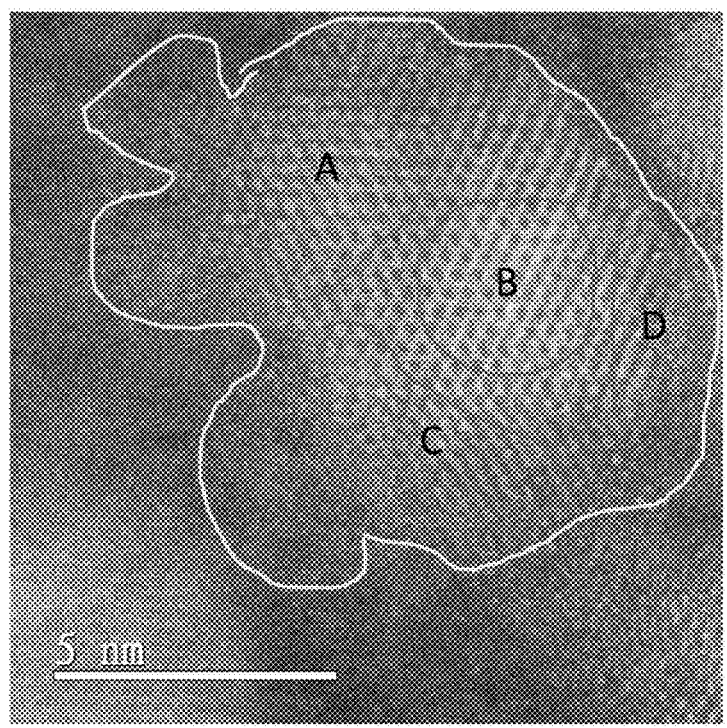
FIG. 5 is a HRTEM image illustrating the structure of the quantum dot of E1.

Referring to FIGS. 4 and 5, the quantum dots of E1 (QD-LSe) are single crystals having a size of 8.0 nm.

Figure 6:
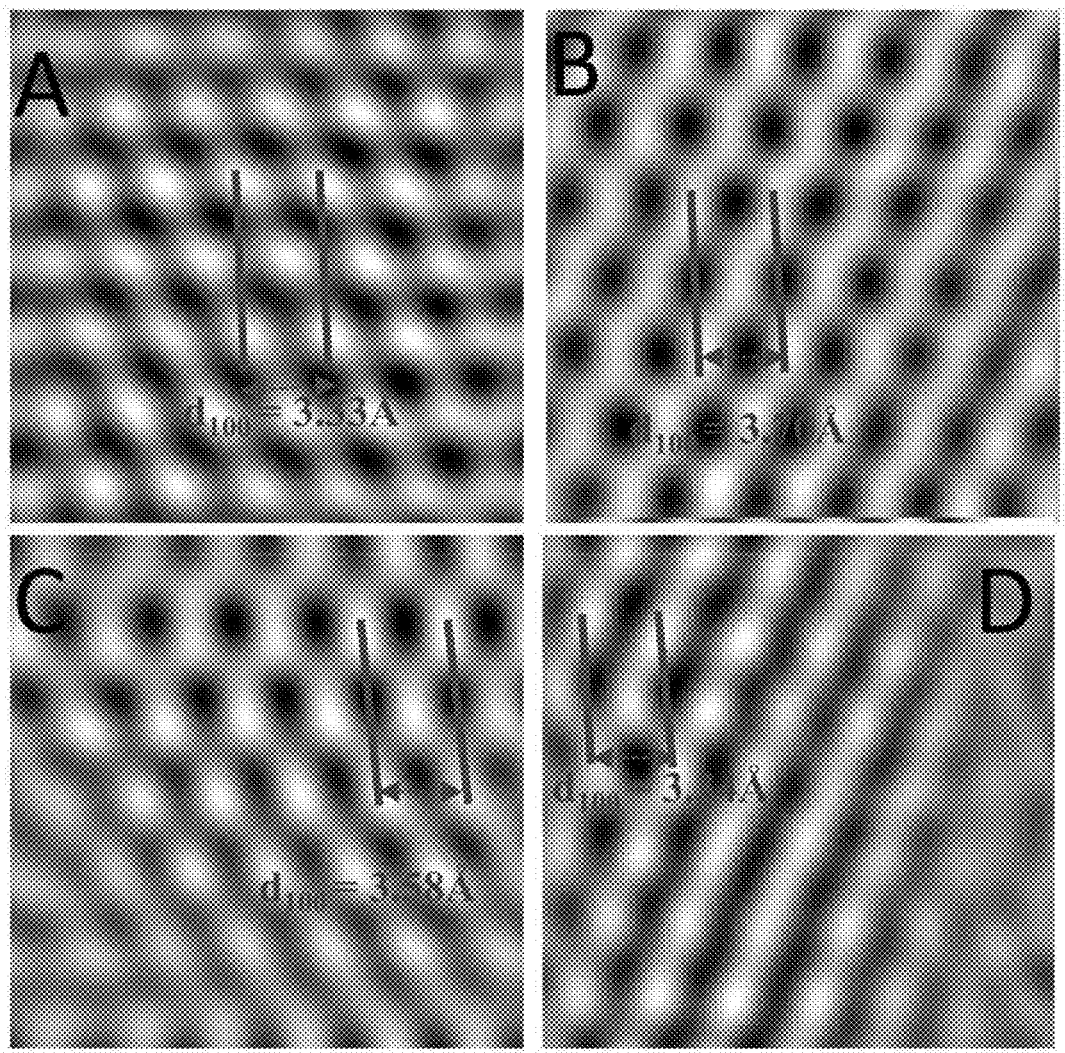
FIG. 6 shows partially enlarged views of FIG. 5 illustrating the quantum dot of E1 having different interplanar spacings of (100) planes ($d_{100}$) at four different areas (represented by A to D)

Referring to FIGS. 5 and 6, the HRTEM images of QD-LSe show that four regions (A, B, C, and D) are present within the QD-LSe, which respectively have an interplanar spacing of (100) plane ($d_{100}$) being 3.33 Å, 3.70 Å, 3.58 Å, and 3.34 Å, indicating that the distribution of atoms in a single crystalline dot is disorder, i.e., Zn, Cd, S, and Se are non-uniformly distributed in the QD-LSe. Each of the A to D regions shown in FIG. 5 may define a respective one of light-emitting regions, which may cooperatively provide a sustained and stable QY.

Figure 7:
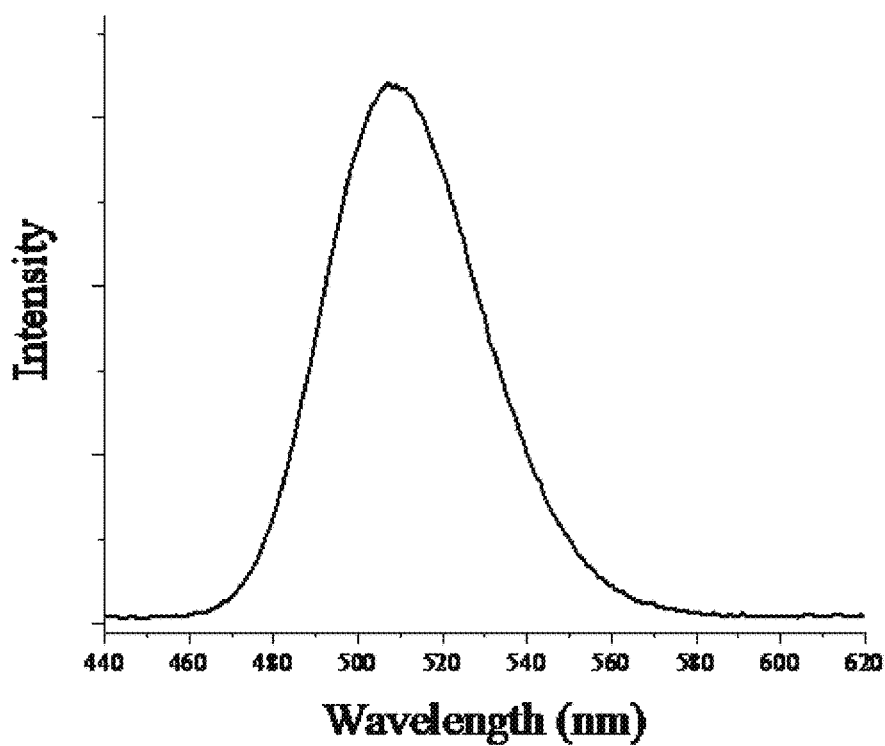
FIG. 7 is a PL spectrum plot illustrating a quantum yield of the quantum dot of E1.

Referring to FIG. 7, after being subjected to ultra-violet irradiation, the QD-LSe of E1 has a light emission wavelength of 508 nm and a QY of 70%.

Figure 8:
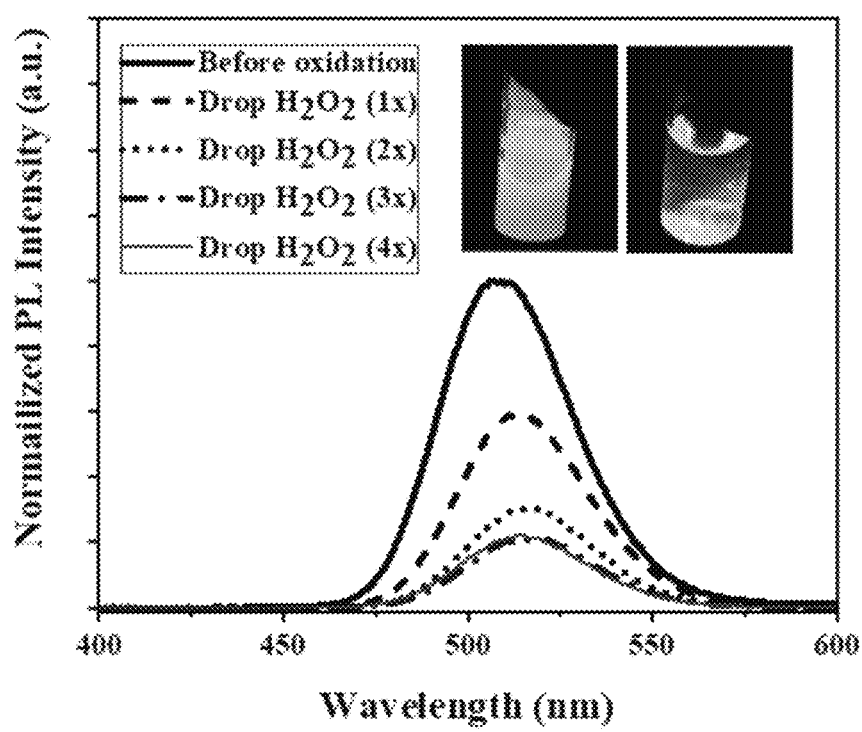
FIG. 8 is a PL spectrum plot illustrating a change in the quantum yield of the quantum dot of E1 before and after oxidation treatment.

As shown in FIG. 8, the QD-LSe has a QY of 70% before the $H_2O_2$ treatment, which gradually decreases to 15% after four times of $H_2O_2$ treatments, but is still greater than that of CE. It is inferred that by virtue of non-uniform distribution of Zn, Cd, S, and Se to define multiple light-emitting regions, the QD-LSe, even being subjected to several times of $H_2O_2$ treatments, is still capable of preserving some light-emitting regions that are not oxidized, so as to maintain QY, thereby improving stability thereof.

Figure 9:
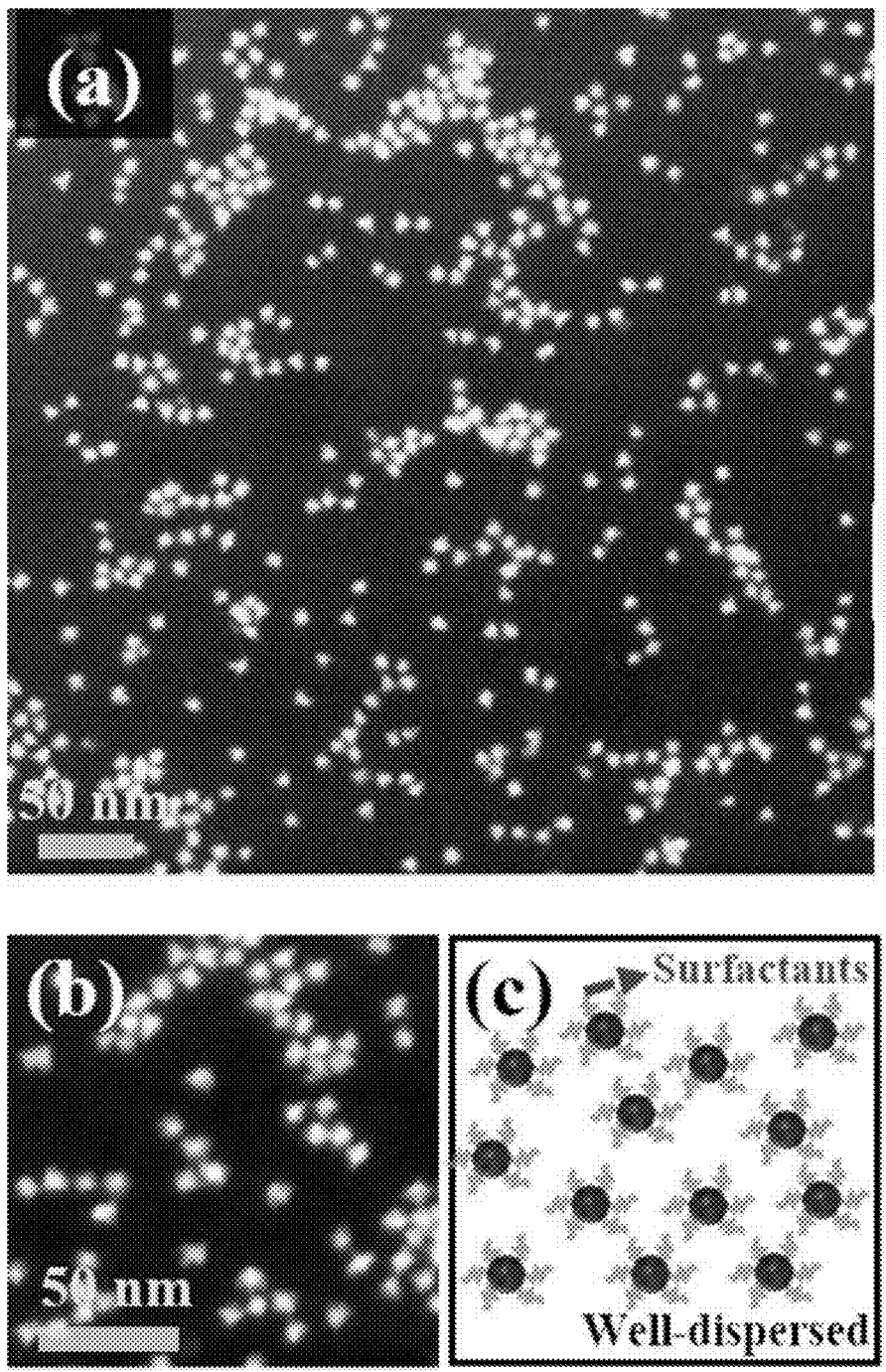
FIG. 9 illustrates a microstructure of the quantum dot of E1 before the oxidization treatment, in which (a) and (b) are respectively low-resolution and high-resolution high-angle annular dark-field (HAADF) images by scanning transmission electron microscope (STEM), and (c) is a schematic view showing quantum dots well dispersed on a copper grid.

As shown in the STEM-HAADF images of FIG. 9, the $H_2O_2$-untreated QDs-LSe exhibits a good dispersion on a carbon-coated copper grid (images (a) and (b)), indicating that the surface ligands of the QDs-LSe remain in good condition (image (c)).

Figure 10:
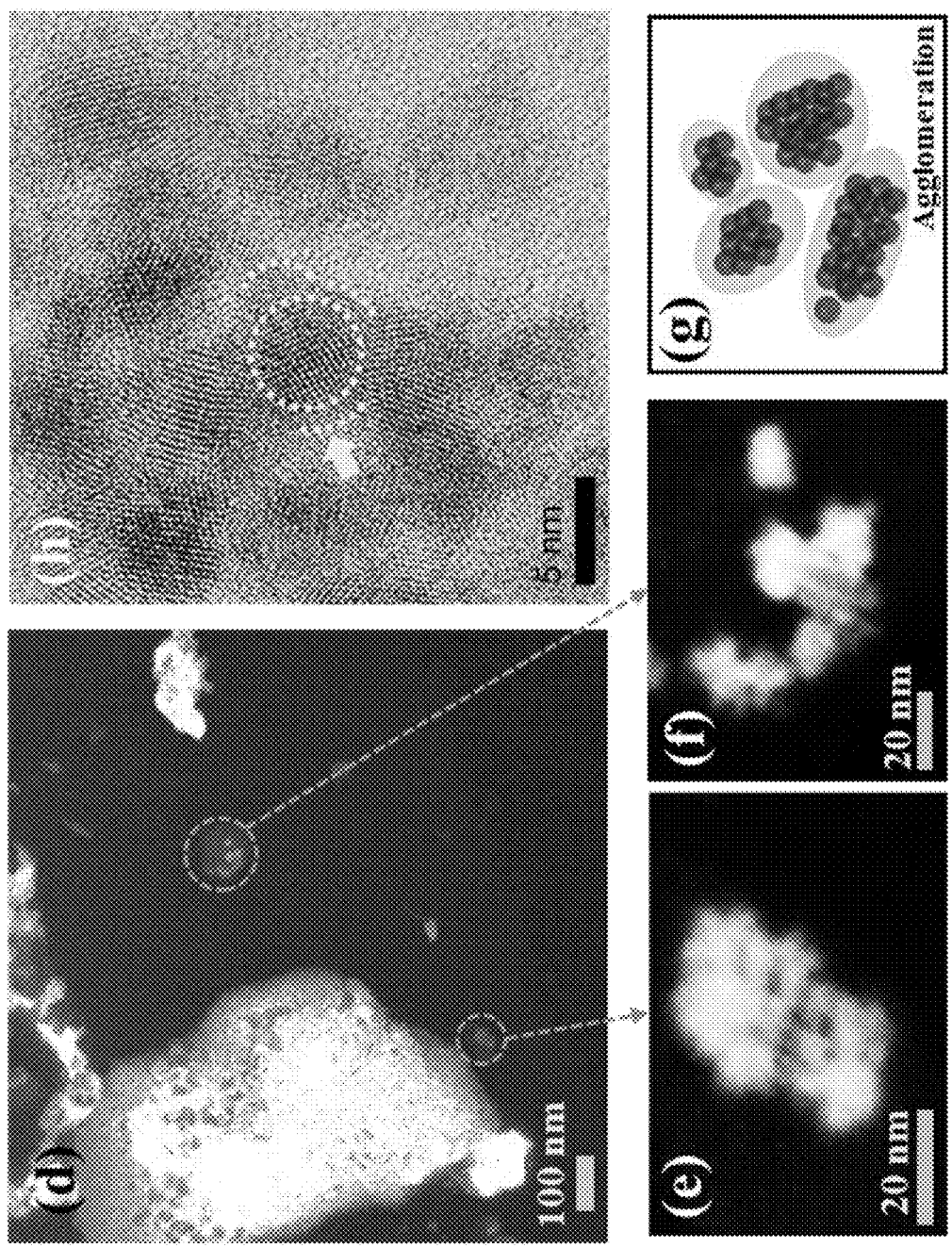
FIG. 10 illustrates a microstructure of the quantum dot of E1 after oxidation treatment, in which (d) is low-resolution STEM-HAADF image, (e) and (f) are high-resolution STEM-HAADF images, (g) is a schematic view showing aggregation of the quantum dots after oxidation treatment, and (h) is a TEM image.

Referring to FIG. 10, after four times of $H_2O_2$ treatment, the QD-LSe aggregates (images (d) to (f)) and becomes large QD-LSe agglomerates (image (g)). In addition, the QD-LSe agglomerates have more amorphous regions and structural defects as indicated by the arrows in image (h) of FIG. 10, indicating that after the $H_2O_2$ treatment, the surface of the QD-LSe is damaged due to the agglomeration, resulting in a decrease in the QY.

Figure 11:
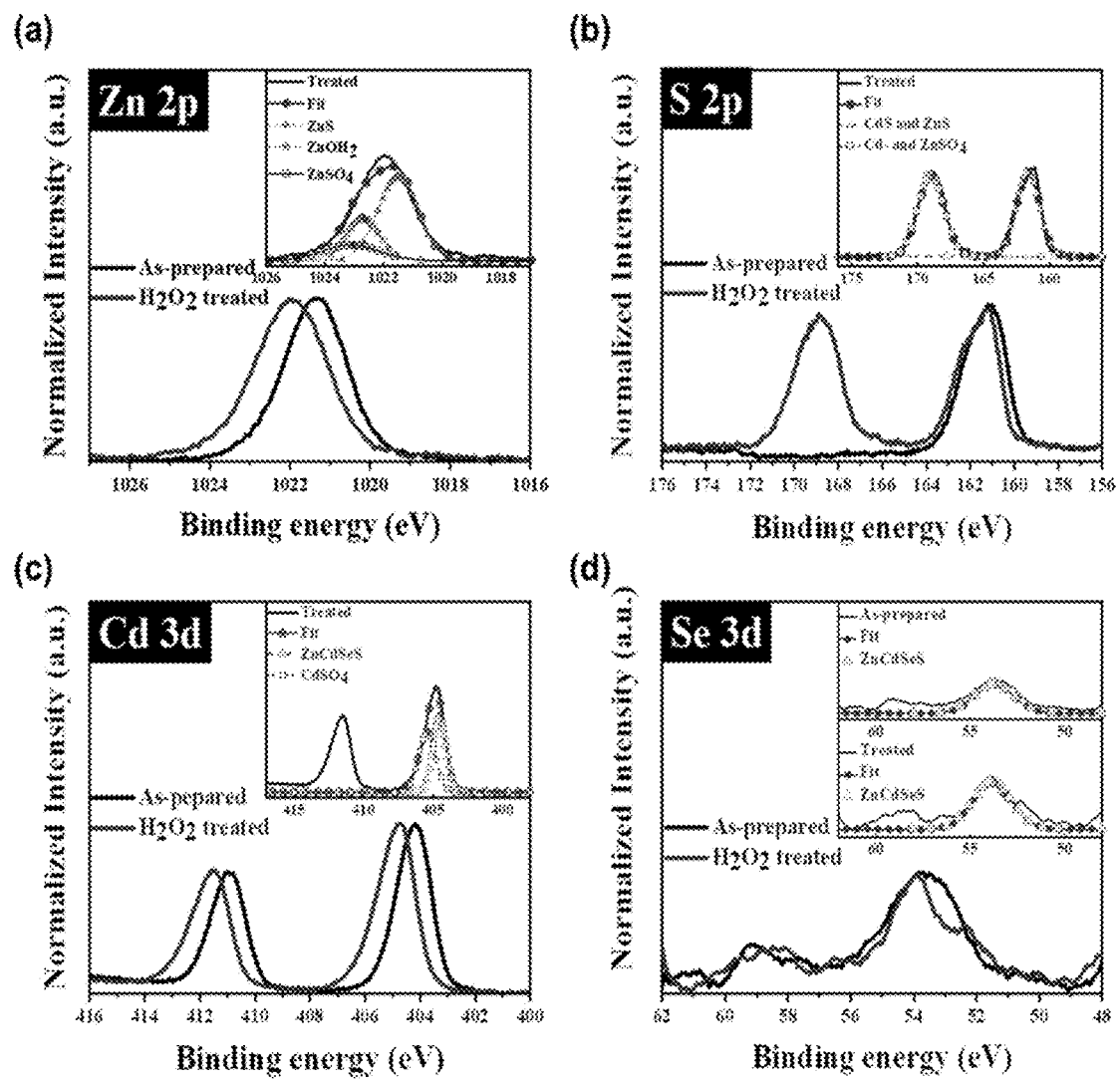
FIG. 11 shows four XPS plots respectively illustrating a change in binding energy of the quantum dot of E1 before and after the oxidation for Zn 2p peak (a), S 2p peak (b), Cd 3d peak (c), and Se 3d peak (d)

It can be seen from the XPS spectra of images (a) and (b) of FIG. 11 that, before the $H_2O_2$ treatment, the QD-LSe has electron binding energies of Zn 2p (1021.3 eV) and S 2p (161.1 eV), which are similar to those of ZnS in CE. After the $H_2O_2$ treatment, the QD-LSe has chemical shifts of +0.7 eV and +7.8 eV in Zn 2p and S 2p, respectively, which are similar to those in CE. The chemical shift of +7.8 eV in S 2p indicates formation of a $ZnCdSO_4$ sulfate phase on the surface of the QD-LSe. Deconvolution of Zn 2p curve of E1 can generate three curve peaks at the electron binding energies of 1021.5 eV, 1022.7 eV, and 1023.1 eV, which are assigned to ZnSSe, $Zn(OH)_2$, and $ZnSO_4$, respectively.

It should be noted that the S 2p peak of the $H_2O_2$-treated QD-LSe preserves a relatively higher intensity of the unoxidized core ($ZnCdSO_4$/ZnS, ~1) as compared with that in CE ($ZnSO_4$/ZnS, ~3) shown in image (b) of FIG. 3, indicating that Cd and Se in the ZnS-based dot body are capable of preventing the QD-LSe from oxidation.

Referring to images (c) and (d) of FIG. 11, before the $H_2O_2$ treatment, the QD-LSe has electron binding energies of Cd 3d peak (404.2 eV) and Se 3d peak (53.7 eV), which are assigned to CdSSe and ZnCdSe, respectively. The $H_2O_2$-treated QD-LSe has a chemical shift of +0.6 eV in Cd 3d peaks (404.2 eV→404.8 eV, 410.9 eV→411.5 eV), which also shows the existence of the sulfate phase (Cd $3d_{5/2}$ $CdSO_4$, 405.8 eV). In addition, although the QD-LSe contains a low Se content (0.8%), slight $SeO_2$ peaks are still observed for both of the $H_2O_2$-untreated (i.e. as-prepared) and $H_2O_2$-treated QD-LSe, and no significant difference therebetween is shown, except that the $SeO_2$ peak of the $H_2O_2$-treated QD-LSe has a chemical shift of +0.2 eV (53.7 eV→53.9 eV).

Figure 12:
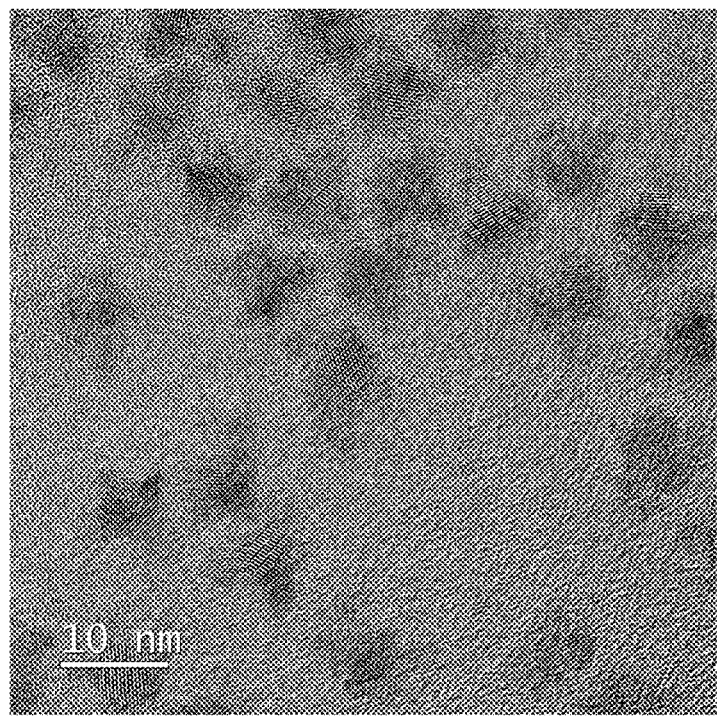
FIG. 12 is a TEM image illustrating a structure of the quantum dot of Example 2 (E2) according to the disclosure.
Figure 13:
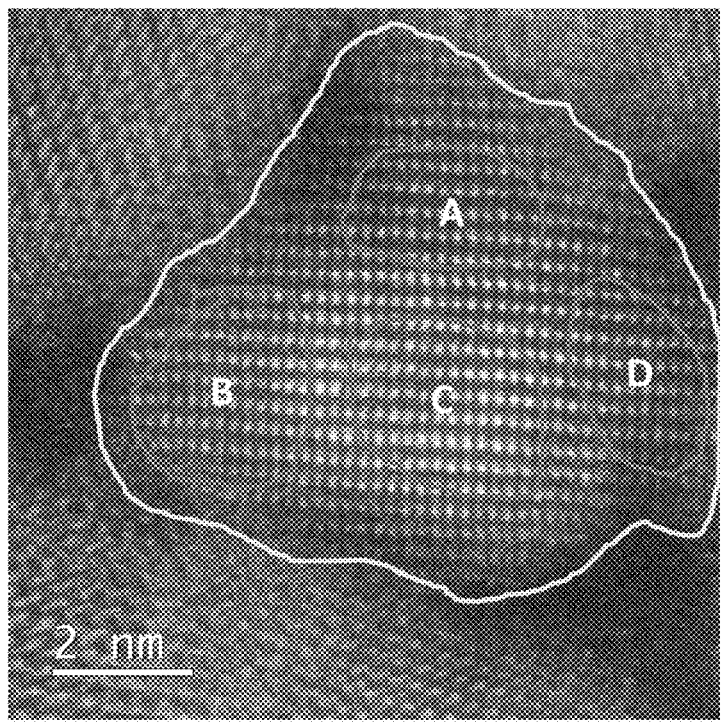
FIG. 13 is a HRTEM image illustrating the microstructure of the quantum dot of E2 according to the disclosure.

Referring to FIGS. 12 and 13, the quantum dots of E2 (QD-HSe) are single crystals having a size of about 7.4 nm.

Figure 14:
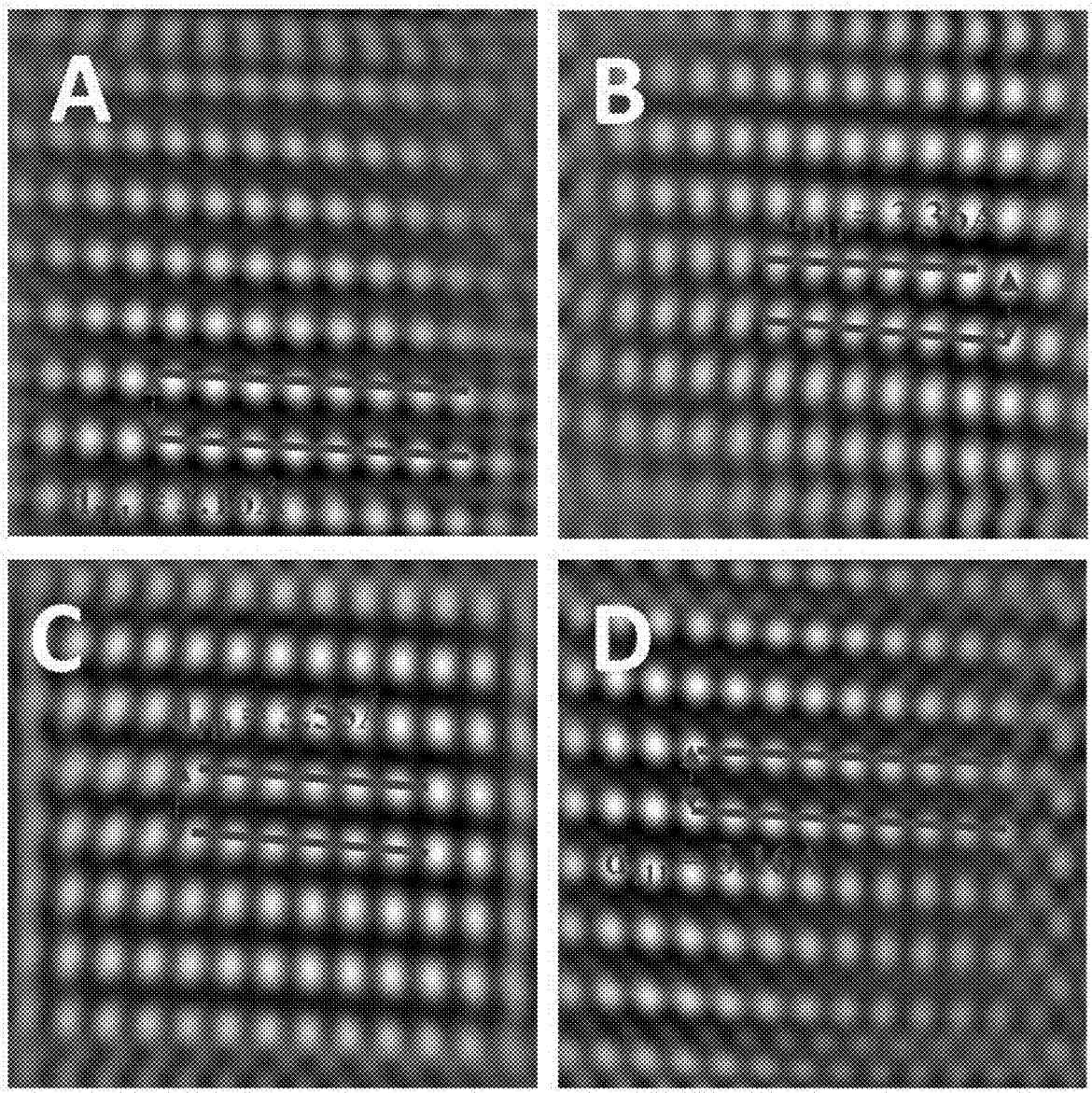
FIG. 14 shows partially enlarged views of FIG. 13 illustrating the quantum dot of E2 having different interplanar spacings of (100) planes (d100) at four different areas (represented by A to D)

Referring to FIGS. 13 and 14, similar to E1, the HRTEM images of E2 show that, four regions (A, B, C, and D) are present within the QD-HSe, which respectively have an interplanar spacing of (111) plane ($d_{111}$) of 3.16 Å, 3.36 Å, 3.55 Å, and 3.16 Å, indicating that the distribution of atoms in a single crystalline dot is disorder, i.e., Zn, Cd, S, and Se are non-uniformly distributed in the QD-HSe. Each of the A to D regions shown in FIG. 13 may define a respective one of light-emitting regions, which may cooperatively provide a sustained and stable quantum yield.

Figure 15:
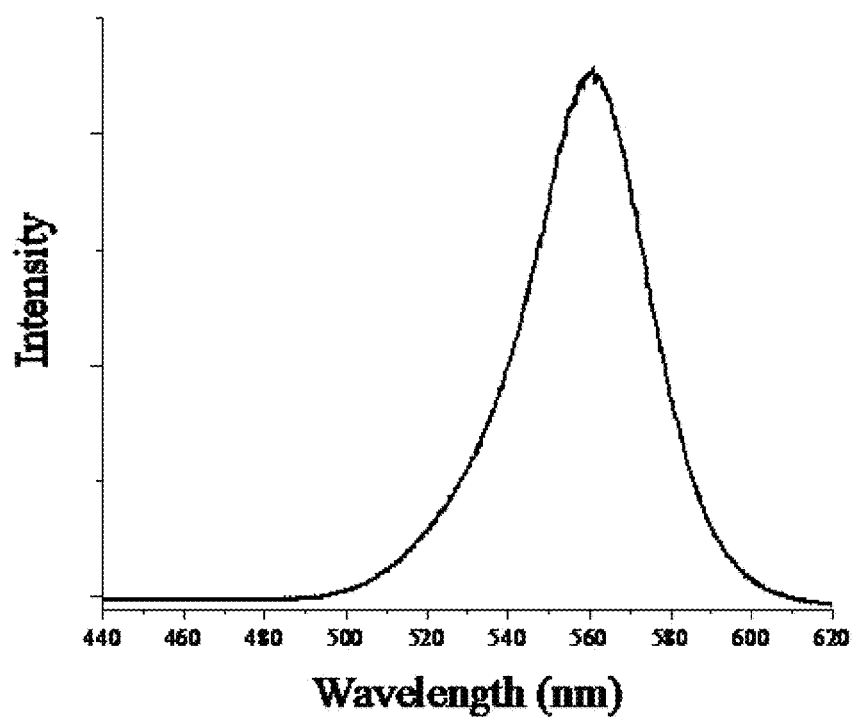
FIG. 15 is a PL spectrum plot illustrating a quantum yield of the quantum dot of E2.

Referring to FIG. 15, after being subjected to ultra-violet irradiation, the QD-HSe of E2 has a light emission wavelength of 558 nm, and has a QY of 90%.

Figure 16:
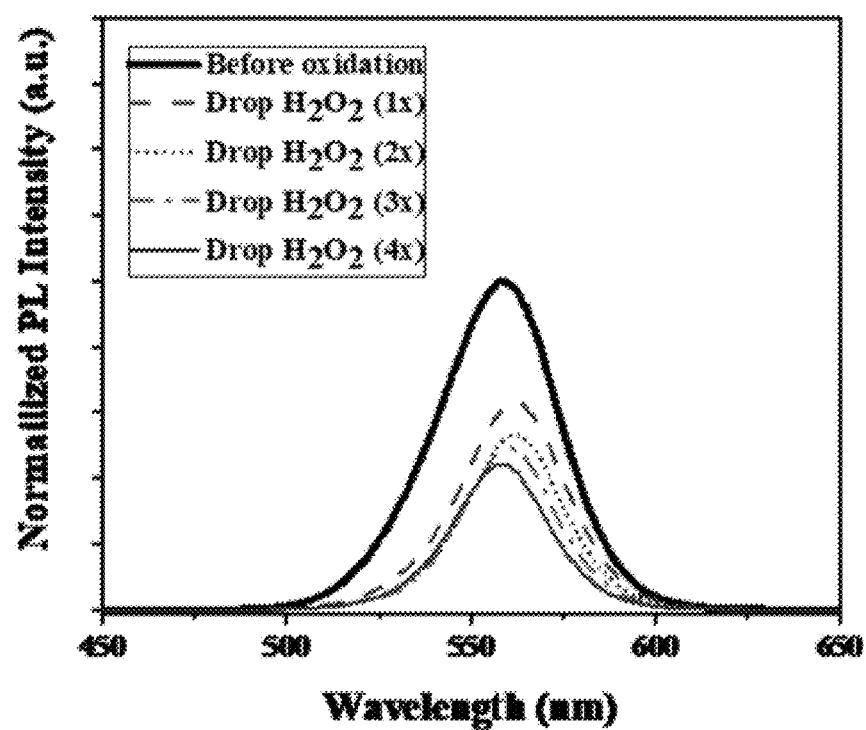
FIG. 16 is a PL spectrum plot illustrating a change in the quantum yield of the quantum dot of E2 before and after oxidation treatment.

Referring to FIG. 16, the QD-HSe has a QY of 90% before the $H_2O_2$ treatment, which gradually decreases to 40% after four times of $H_2O_2$ treatments. As compared with the PL spectra of E1 (FIG. 8), a degree of decrement of the QY in E2 is relatively less after each $H_2O_2$ treatment. It is inferred that a relatively higher Se content (4.3%) of the QD-Hse is conducive for suppressing oxidation and increasing stability thereof. Although $H_2O_2$ treatments may decrease the QY of the QD-HSe due to oxidation of a portion of the light-emitting regions, the remaining unoxidized light-emitting regions allow the QD-HSe to still exhibit QY of 40%.

Figure 17:
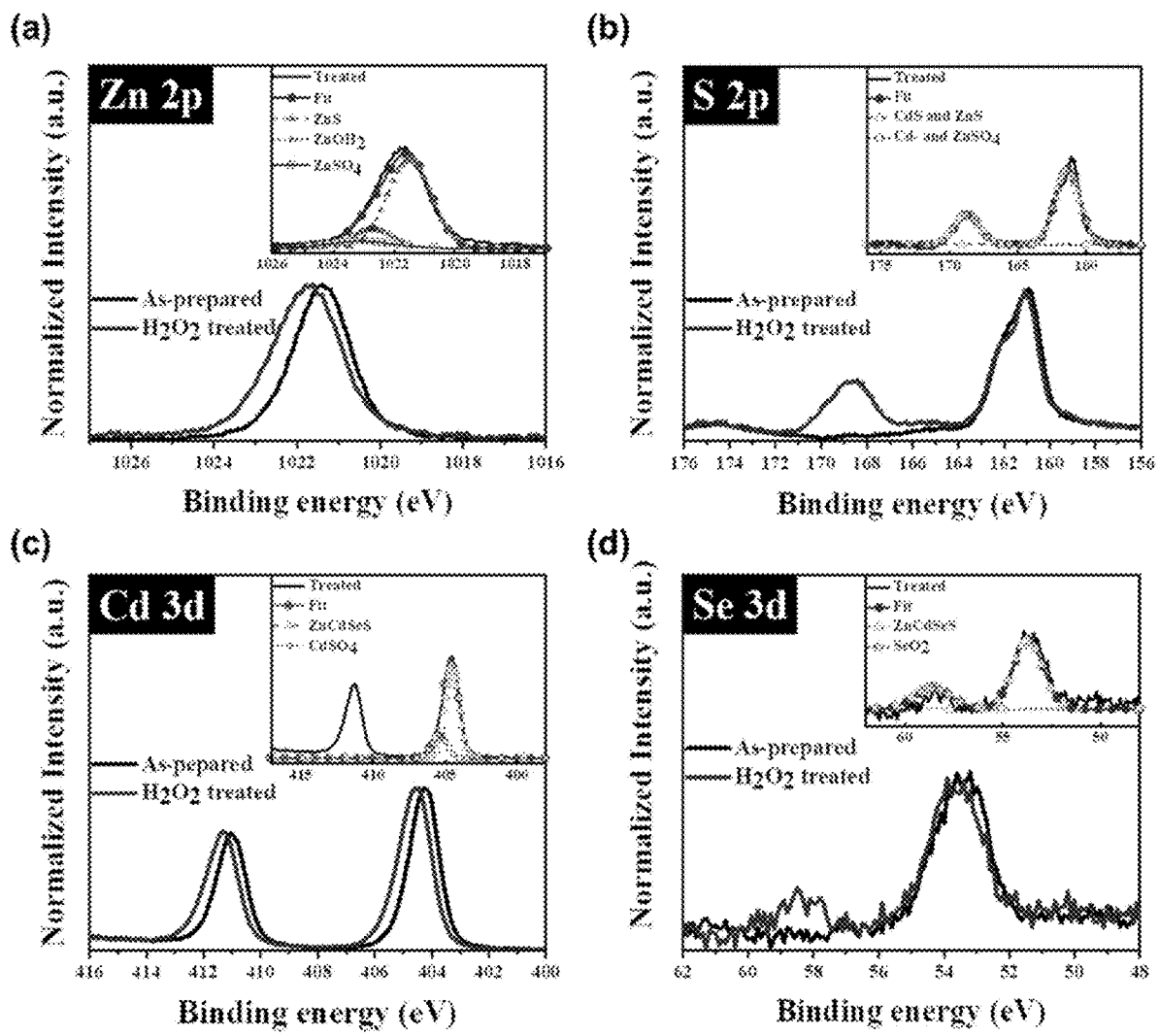
FIG. 17 shows four XPS plots respectively illustrating a change in binding energy of the quantum dot of E2 before and after oxidation treatment (represented by "As-prepared"

Referring to FIG. 17, before the $H_2O_2$ treatment, the QD-HSe has electron binding energies of Zn 2p (1021.4 eV) and S 2p (161.0 eV) (see images (a) and (b)), which are respectively similar to those of the QD-LSe of E1. After the $H_2O_2$ treatment, the $H_2O_2$-treated QD-HSe has a chemical shift in Zn 2p (+0.3 eV), which is smaller than that of the $H_2O_2$-treated QD-LSe (+0.7 eV). In addition, a relative intensity in S 2p peak of $ZnSO_4$/ZnS decreases to about 0.5 (i.e., the relative intensity in S 2p peak of metal-$SO_4$/metal-S for $H_2O_2$-treated ZnS, QD-LSe and QD-HSe is 3, 1, and 0.5, respectively). Deconvolution of Zn 2p peak of E2 shows three phases including ZnSSe, $Zn(OH)_2$, and $ZnSO_4$ phases, wherein the intensities of $Zn(OH)_2$ and $ZnSO_4$ phases are obviously decreased. These results indicate that a relatively higher content of Se in the QDs of E2 appears to reduce oxidation of Zn and S so as to form a zinc sulfate phase after the $H_2O_2$ treatment. Since the Cd contents in E1 and E2 are similar, it is suggested that the increased Se content in the QDs of this disclosure may significantly suppress the oxidation of Zn and S.

Referring to images (c) and (d) of FIG. 17, the Cd 3d and Se 3d peaks of the $H_2O_2$-treated QD-HSe are similar to those of the $H_2O_2$-treated QD-LSe, and the existence of $CdSO_4$ phase is also observed in the $H_2O_2$-treated QD-HSe. However, the chemical shift of the Cd 3d peak of the $H_2O_2$-treated QD-HSe (+0.3 eV) slightly decreases as compared with that of the QD-LSe (+0.6 eV). Since the electronegativities of Zn, Cd, S, and Se are similar, the aforesaid slight decrease in chemical shift of the QD-HSe may be caused by lesser surface oxidation of the QD-HSe.

According to the aforesaid XPS results and analysis for E1 and E2, it is noted that the QD-HSe having a higher Se content is more resistant to oxidation. That is, Se may suppress the oxidation tendency of Zn, Cd, and S phases in the QDs of this disclosure, which is likely correlated to thermodynamics of the reaction. To be specific, according to calculated Gibbs free energies) ($\Delta G^\circ$) of possible oxidation products ($SeO_2$, $\Delta G^\circ < -225.3$ KJ/mol; ZnO, $\Delta G^\circ = -318.3$ KJ/mol; $Zn(OH)_2$, $\Delta G^\circ = -555.1$ KJ/mol; $SO_4^2$, $\Delta G^\circ = -744.5$ KJ/mol; and $ZnSO_4$, $\Delta G^\circ = -871.5$ KJ/mol), $SeO_2$ has a less negative $\Delta G^\circ$, indicating that Se has a relatively lower reactivity with oxygen as compared with other elements. Therefore, the surface of the QD-HSe that contains higher Se content is not easily oxidized, such that the QD-HSe has an improved stability and QY.

Referring to FIGS. 18 and 19, the quantum dot of E3 (QD-HSe/mZnS) are single crystals having a size of about 12 nm.

Referring to FIGS. 19 and 20, three regions (A, B, and C) are present within the QD-HSe/mZnS, which respectively have a interplanar spacing of (100) planes ($d_{100}$) being 3.46 Å, 3.30 Å, and 3.21 Å, indicating that Zn, Cd, S, and Se are non-uniformly distributed in the QD-HSe/mZnS. Each of the A to C regions shown in FIG. 19 may define a respective one of light-emitting regions, which may cooperatively provide a sustained and stable quantum yield of the QD-HSe/mZnS.

Referring to FIG. 21, after being subjected to ultra-violet irradiation, the QD-HSe/mZnS of E3 has a light emission wavelength of 533 nm and a QY of 80%.

Referring to FIG. 22, after the first $H_2O_2$ treatment, the QD-HSe/mZnS has a slight decrease in the QY, and after the second to fourth $H_2O_2$ treatments, the QY of the QD-HSe/mZnS merely decreases from 80% to 60%. The results indicate that as compared to E1 and E2, the QD-HSe/mZnS including the ZnS shell layer surrounding the ZnS based-dot body is more resistant to oxidation.

Referring to FIG. 23, the quantum dot of E4 (QD-LSe/tZnS) are single crystals having a size of about 18 nm.

Referring to FIGS. 24 and 25, five regions (A, B, C, D, and E) are present within the QD-LSe/tZnS, which respectively have an interplanar spacing of (100) plane ($d_{100}$) being 3.35 Å, 3.62 Å, 3.78 Å, 3.35 Å, and 3.51 Å, indicating that Zn, Cd, S and Se are non-uniformly distributed in the QD-LSe/tZnS. Each of the A to E regions shown in FIG. 24 may define a respective one of light-emitting regions, which may cooperatively provide a sustained and stable QY.

Referring to FIG. 26, after being subjected to ultra-violet irradiation, the QD-LSe/tZnS has a light emission wavelength of 493 nm and a QY of 60%.

Referring to FIG. 27, a difference in the QY of the QD-LSe/tZnS before and after the first $H_2O_2$ treatment is small. After the second, third, and fourth $H_2O_2$ treatments, the OY of the QD-LSe/tZnS decreases from 60% to 36%, and an emission wavelength thereof is shifted towards the longer wavelength. Similar to E3, the ZnS shell layer may allow the QD-LSe/tZnS to be more resistant to oxidation.

Referring to FIG. 28, no significant chemical shifts of Zn 2p and Cd 3d peaks are observed for both of the $H_2O_2$-untreated and the $H_2O_2$-treated QD-LSe/tZnS, demonstrating that the ZnS shell layer of the QD-LSe/tZnS can effectively suppress the oxidation of Zn and Cd ions in the QD-LSe/tZnS. It should be noted that a slight sulfate phase (S 2p, 168.8 eV, a chemical shift of +7.3 eV) is found in the $H_2O_2$-treated QD-LSe/tZnS, indicating that a small amount of S on the surface of the ZnS shell layer is oxidized to $SO_4^{2-}$. The aforesaid results indicate that although the surface of the ZnS shell layer is slightly oxidized, the oxidation of Zn and Cd in the QD-LSe/tZnS is mainly suppressed by the ZnS shell layer. These findings can be also used to explain the excellent oxidation-resistance observed in the QD-HSe/mZnS of E3, which has the ZnS shell layer similar to E4. In addition, as the QD-HSe/mZnS of E3 has a higher Se content than the QD-LSe/tZnS of E4, it can maintain a greater QY after several times of $H_2O_2$ treatment.

In summary, by virtue of non-uniform distribution of Zn, Cd, S, and Se to define multiple light-emitting regions, and by virtue of incorporation of Se to suppress the oxidation of Zn and Cd, the quantum dots of the present disclosure exhibit an enhanced oxidation resistance and stability, and therefore has an improved QY. In addition, by further forming the ZnS shell layer to withstand oxidation conditions, the quantum dots of this disclosure can exhibit a more improved stability and QY.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A quantum dot, represented by $Zn_{0.5-x}Cd_xS_{0.5-y}Se_y$, and having a size ranging from 7 nm to 20 nm;
    wherein $0 < x < 0.2$ and $0.005 \leq y < 0.2$; and
    wherein Zn, Cd, S, and Se are non-uniformly distributed in said quantum dot.

2. The quantum dot of claim 1, wherein $0.02 < x < 0.18$.

3. The quantum dot of claim 1, wherein $0.005 \leq y < 0.05$.

4. The quantum dot of claim 1, which has a quantum yield ranging from 30% to 90%.

5. The quantum dot of claim 1, including a ZnS-based dot body that contains Cd and Se.

6. The quantum dot of claim 5, which has a core-shell structure, and including said ZnS-based dot body serving as a core, and a ZnS shell layer surrounding said ZnS-based dot body.

7. The quantum dot of claim 5, wherein y ranges from 0.008 to 0.043.

8. The quantum dot of claim 6, wherein y ranges from 0.005 to 0.037.

* * * * *